US006944233B2

(12) United States Patent
Zhang et al.

(10) Patent No.: US 6,944,233 B2
(45) Date of Patent: Sep. 13, 2005

(54) TURBO CODING FOR FAST FADING CHANNELS

(75) Inventors: Jinyun Zhang, New Providence, NJ (US); Phillip Orlik, Scotch Plains, NJ (US); Jyhchau Horng, Warren, NJ (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 668 days.

(21) Appl. No.: 10/017,535

(22) Filed: Dec. 12, 2001

(65) Prior Publication Data

US 2003/0108115 A1 Jun. 12, 2003

(51) Int. Cl.[7] ............................ H04L 23/02; H04B 7/02

(52) U.S. Cl. ........................ 375/261; 375/267; 375/347

(58) Field of Search ................................. 375/261, 341, 375/267, 347; 455/134–139; 714/786, 790

(56) References Cited

U.S. PATENT DOCUMENTS 6,014,411 A 1/2000 Wang ......................... 375/259
6,622,023 B2 * 9/2003 Chheda ...................... 455/522
2002/0022468 A1 * 2/2002 Yoon et al. ................. 455/403
2002/0089965 A1 * 7/2002 Kim ........................... 370/342

OTHER PUBLICATIONS

"Comparison of ¼ turbo coding methods for HSDPA," TSG–RAN WG1 #21, Turin, Italy, Aug. $27^{th}$–$31^{th}$, 2001.

* cited by examiner

*Primary Examiner*—Tesfaldet Bocure
(74) *Attorney, Agent, or Firm*—Dirk Brinkman; Andrew J. Curtin

(57) ABSTRACT

A method for communicating a bit stream using turbo coding encodes each input bit in the bitstream using a single 1/3 rate turbo encoder to produce a set of three bits. One of the three bits in each set is repeated to produce a set of four bits for each input bit. A time interval between the four bits is increased before transmitting the set of four bits on a communications channel. In a receiver, the time interval between the set of four bits received via the communications channel is decreased using a de-interleaver. The received set of four bits are diversity combine into a received set of three bits, and then a single 1/3 rate turbo decoder is used to recover an output bit for each input bit.

11 Claims, 2 Drawing Sheets

TURBO CODING FOR FAST FADING CHANNELS

FIELD OF THE INVENTION

This invention relates generally to wireless communication, and more particularly to turbo coding.

BACKGROUND OF THE INVENTION

A new class of forward error correcting codes that use parallel concatenated recursive codes, also known as "turbo codes," plays a key role in wireless communications, see C. Berrou and A. Glavieux, "Near optimum error-correcting coding and decoding: turbo-codes," *IEEE Trans. Comm.,* vol. 44, pp.1261–1271, 1996. Turbo codes offer significant coding gain for power limited communication channels using, for example, wideband code division multiple access (WCDMA).

Typically, turbo codes are generated by using recursive systematic convolution (RSC) encoders operating on different permutations of each input bit. A subset of the output bits generated by the encoders is transmitted through the channel to maintain bandwidth efficiency. Turbo decoding involves an iterative process in which probability estimates of the input bits are derived from the received bits. Each iteration of the processing generally increases the reliability of the probability estimates. This process continues, alternately decoding the received bits, until the probability estimates can be used to make reliable decisions.

Turbo codes have near optimal performance in terms of coding gain, that is, they approach the Shannon limit, see C. Berrou et al. entitled "Near Shannon Limit Error-Correcting Coding And Decoding: Turbo-Codes," Proceedings of the IEEE International Conference on Communications, pages 1064–1070, 1993. However, turbo codes suffer from a complex decoding process. This complexity comes from the soft output processing and the iterative nature of the decoder. The complexity grows exponentially with respect to the number of states in a decoding trellis.

Turbo encoders can have various coding rates. A code rate is the ratio of the number of input bits to the number of output bits transmitted on the channel. For example, in a 1/2 rate turbo encoder, there are two output bits for each input bit. In many applications, such as high speed down link packet access (HSDPA), turbo codes with lower coding rates, such as a 1/4 code rate, are used. Lower coding rates combat some severe channel conditions. Decreasing the code rate improves the bit-error rate (BER) performance. However, for a fixed data rate, decreasing the code rate increases the transmission symbol rates. If a channel is bandwidth limited, then limited transmission symbol rates are required.

One way of not increasing the transmission symbol rate while achieving a low code rate performance is to "puncture" the transmitted symbols. Puncturing is a process of deleting a portion of transmitted symbols. The puncturing process is characterized by a puncture pattern used by the turbo encoder. The turbo decoder implements a bit insertion process that is the inverse function of the puncturing process. Bit insertion adds bits to the received bit sequence according an insertion pattern.

One way to get a 1/4 turbo code is to punctures a 1/5 turbo code produced by two (RSC) codes both have the coding rate of 1/3. This conventional way achieves a high code rate from the lower code rate, see J. Hagenauer, "Rate-compatible punctured convolutional codes (RCPC codes) and their applications," *IEEE Trans. Comm.,* vol. 36, is. 4, pp.389–400, April 1988.

FIG. 1 shows a prior art 1/4 rate turbo encoder 100 with two (RSC) 1/3 rate coders 111–112. For each input bit 101, the two RSC coders 111–112 produce five output bits 102. In order to attain a 1/4 rate turbo code, a puncture pattern 120, e.g., [111111;111111;101010;111111;101010], is used to reduce the five output bits to four transmitted bits 103.

This puncture pattern completely embeds the data generated at the higher code rate into the data generated at the lower rate. Therefore, the decoder for the lowest code rate is applicable to any data generated by a punctured high code rate. In this case, the decoding complexity is actually determined by the decoder with the lowest code rate, i.e., 1/5 rate turbo code, which corresponds to the number of states in a decoding trellis. This scheme guarantees good performance in adaptive white Gaussian noise (AWGN) channels with a high coding gain. However, puncturing and corresponding bit insertion results in degradation of the BER performance while decreasing the transmission symbol rate to be within the acceptable channel bandwidth.

Therefore, it is desired to provide a 1/4 rate turbo coding process with good BER performance and less complexity.

SUMMARY OF THE INVENTION

The invention provides a 1/4 rate turbo code for wide band wireless communications systems. A transmitter uses a single 1/3 rate turbo encoder to construct a 1/4 rate turbo code by repeating input bits in a pre-defined pattern. It also adopts an interleaver at the transmitter to further spread the distance between the repeated bits beyond what exists in current WCDMA standards.

A receiver uses diversity technique to combine received repeating bits, so that a single standard 1/3 turbo decoder can be used to recover the input bits. This method combines diversity gain and coding gain effectively so that the performance of this method in channels with both AWGN and fast Doppler fading is equivalent to methods that puncture a 1/5 rate turbo code to achieve a 1/4 rate turbo code. In addition, the method and system according to the invention have a lower coding complexity than the comparable 1/4 rate prior art turbo coding.

More specifically, a method for communicating a bit stream using turbo coding encodes each input bit in the bitstream using a single 1/3 rate turbo encoder to produce a set of three bits. One of the three bits in each set is repeated to produce a set of four bits for each input bit. A time interval between the four bits is increased before transmitting the set of four bits on a communications channel.

In a receiver, the time interval between the set of four bits received via the communications channel is decreased using a de-interleaver. The received set of four bits are diversity combined into a received set of three bits, and then a single 1/3 rate turbo decoder is used to recover an output bit for each input bit.

DETAILED DESCRIPTION OF THE PREFERRED EMBODIMENT

1/4 Rate Turbo Encoding with Repetition

Figure 1:
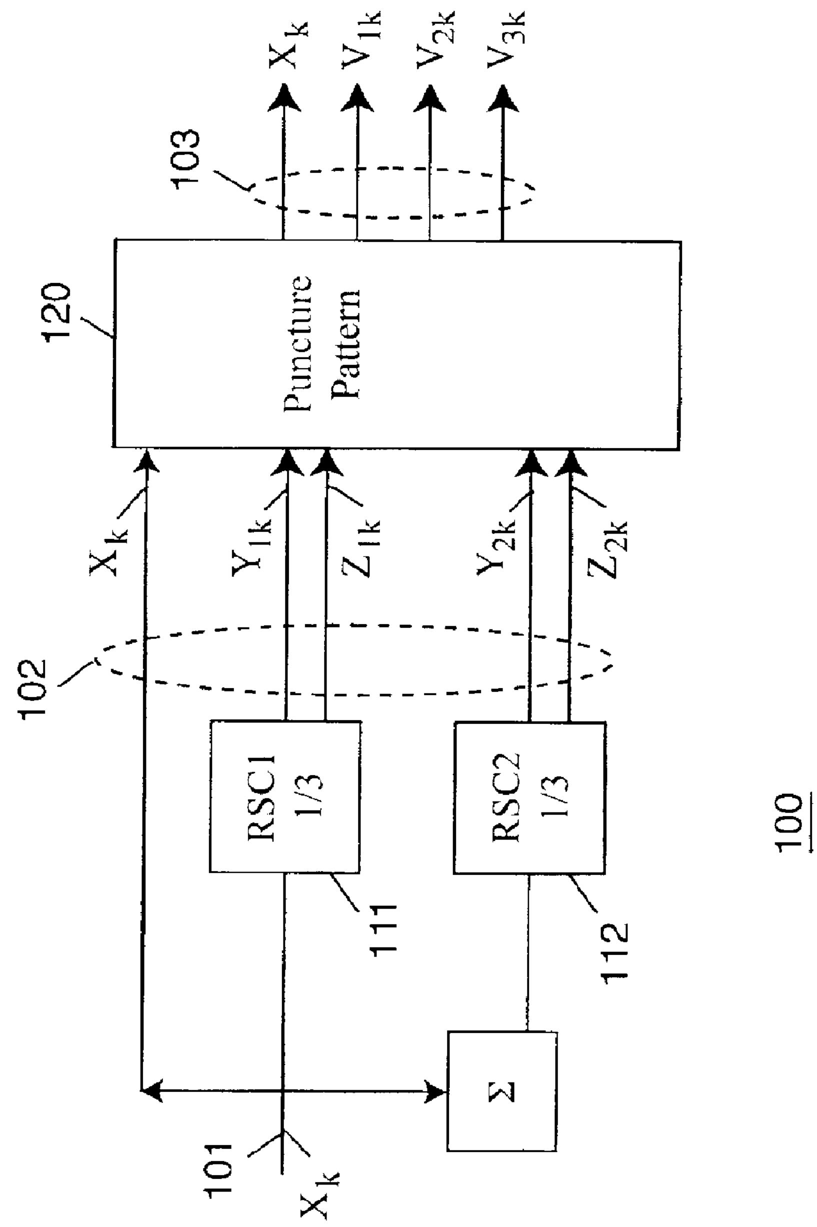
FIG. 1 is a block diagram of a prior art 1/4 rate turbo encoder.
Figure 2:
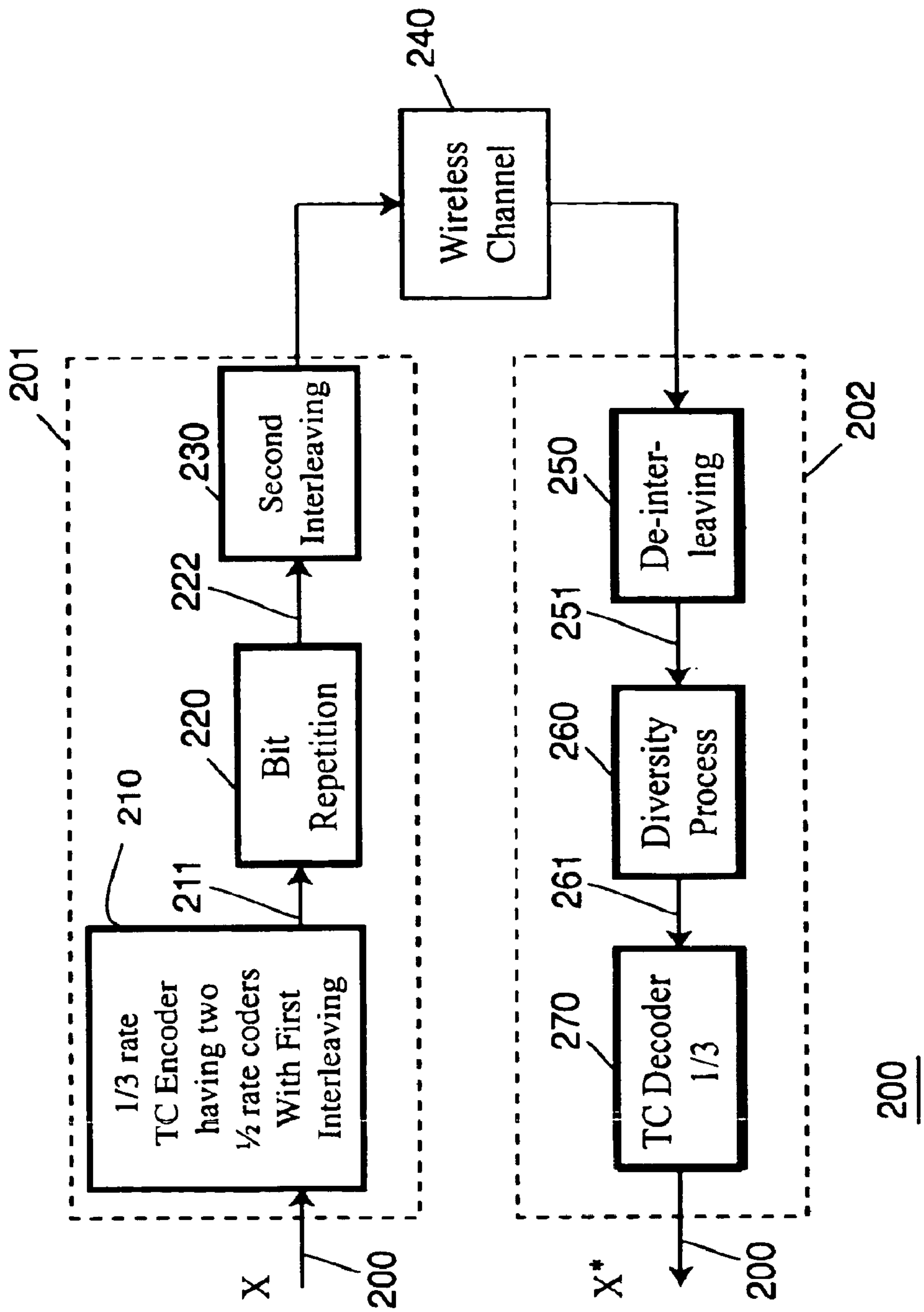
FIG. 2 is a block diagram of an 1/4 rate turbo encoding and decoding according to the invention.

FIG. 2 shows the encoding 201 and decoding 202 according to the invention. In a transmitter, a single 1/3 rate turbo encoder 210 for wideband code division multiple access (WCDMA) has two RSC coders, each with a 1/2 rate turbo coder, and a first interleaver. These are well known, although prior art 1/4 rate encoders typically include two RSC coders. Therefore, an input bit $X_k$ 200 produces a set of three output bits $X_k$, $Y_{1k}$, and $Y_{2k}$ on line 211.

In order to attain a 1/4 code rate, one more bit is added for every set of three output bits. The repetition 220 is based on a process described in "*Comparison of* 1/4 *turbo coding methods for HSDPA,*" TSG-RAN WG1 #21, Turin, Italy, Aug. $27^{th}$–$31^{th}$, 2001. The bits $X_k$, $Y_{1k}$, and $Y_{2k}$ are repeated, one by one, for every three bits in a cyclic manner. The effect of the repeating is to lower the code rate on line 211 from the 1/3 code rate to a 1/4 code rate on line 222 for a set of four bits.

In many wireless channels where both AWGN and fast fading dominate, if one bit undergoes a deep fade, then the other repeated bit may be strong enough for detection. Therefore a second interleaver 230 is used to increase the time interval between the repeated bits before the set of four bits 103 is transmitted over a wireless channel 240. The second interleaver is used so that the time interval between any two identical bits is larger than a channel coherent time.

1/4 Rate Turbo Decoding with Diversity Combining

In a receiver, the received set of four bits is first de-interleaved using a second interleaver 250 to decrease the time interval between received bits from the 1/4 rate to the 1/3 rate. Then, diversity combining 260 is performed to reduce the set of four bits on line 251 to a set of three bits on line 261. Time diversity gain is exploited to combat fast fading channels. Any diversity technique, such as, selection diversity, equal gain diversity, or maximum MRC diversity, can be used for identically transmitted bits.

Finally, the resulted data stream is decoded using a single 1/3 code rate turbo decoder 270 to recover an output bit X* 209 corresponding to the input bit 200. Any known decoding method for 1/3 rate turbo codes can be used including MAP processes, Log-MAP, SOVA, and the like.

The invention provides at least two advantages. First, the diversity processing 260 performs well for fast fading channels because both diversity gain and coding gain are taken into account. Second, standard 1/3 rate turbo codes can be used directly. This reduces the computational complexity when compared with prior art 1/4 turbo coding techniques.

Diversity Processing for Repetition Method

In a fast but flat fading channels, If the time interval between any two identical bits is longer than the channel coherent time, then the received two bits can be considered independent. This is the idea behind the time diversity. Equivalently, one can consider that there are two antennas for these two identical bits. As a result, conventional spatial diversity methods can be adopted to process the two identically transmitted bits. These methods include selection diversity, equal gain diversity, and maximum ratio diversity, and the like.

An average SNR at the receiver antenna is $\Gamma=(E_b/N_0)\overline{\beta}$, where $\overline{\beta}$is the Rayleigh distribution related. This value should be identical for each of the two 1/4 turbo code environments due to identical code rates.

The probability distribution function of the instantaneous SNR=$\gamma_t$is $$p_r(\gamma_t)=\frac{1}{\Gamma}e^{\frac{-\gamma_t}{\Gamma}},$$

$\gamma_t \geqq 0$. Therefore, the probabilty that the received signal is less than a specific SNR threshold $\gamma$ is $P_1(\gamma)=1-e^{\gamma/\Gamma}$. Apparently, the probability that two identical bits are concurrently less than $\gamma$, is $P_2(\gamma)=(1-e^{\gamma/\Gamma})^2$, which means diversity gain can be achieved.

Selection diversity chooses the bit with the higher value of energy from two identical source bits. Equal gain and maximum ratio combining (MRC) diversities combine the two received bits with weights. Equal gain uses the same weight for both bits, while MRC uses different weights according to individually received SNRs. Generally the performance increases in the order of selection, equal gain, and MRC diversities. Diversity selection is done for the set of received bits to reduce the set to three bits.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for communicating a bit stream using turbo coding comprising:

encoding each input bit in the bit stream using a single 1/3 rate turbo encoder to produce a set of three bits for each input bit;

repeating one of the three bits in each set to produce a set of four bits for each input bit;

increasing a time interval between the four bits in the set before transmitting the set of four bits on a communications channel;

decreasing the time interval between the set of four bits received via the communications channel;

diversity combining the received set of four bits into a received set of three bits; and decoding each received set of three bits using a 1/3 rate turbo decoder to recover an output bit for each input bit.

2. The method of claim 1 wherein encoding uses two coders, each with a 1/2 rate turbo coder, and a first interleaver.

3. The method of claim 1 wherein one of the three bits is repeated in a cyclic manner.

4. The method of claim 1 wherein the time interval is increased with a second interleaver.

5. The method of claim 1 wherein the time interval between any two identical bits is larger than a channel coherent time.

6. The method of claim 1 wherein diversity combining uses selection diversity.

7. The method of claim 1 wherein diversity combining uses equal gain diversity.

8. The method of claim 1 wherein diversity combining uses maximum ratio combining.

9. The method of claim 1 wherein the decoding uses maximum a prior processes.

10. The method of claim 1 wherein the diversity combining is applied to the set of four received bits.

11. A system for communicating a bit stream using turbo coding comprising:

a transmitter further comprising a single 1/3 rate turbo encoder configured to encode each input bit in the bit stream using to produce a set of three bits, a bit repeater configured to repeat one of the three bits in each set to produce a set of four bits for each input bit, and an interleaver configured to increase a time interval between the four bits in the set before transmitting the set of four bits on a communications channel; and a receiver further comprising a de-interleaver configured to decrease the time interval between the set of four bits received via the communications channel, a diversity combiner configured to reduce the received set of four bits into a received set of three bits, and a single 1/3 rate turbo decoder configured to decode each received set of three bits to recover an output bit for each input bit.

* * * * *